United States Patent [19]

Skeels et al.

[11] Patent Number: 5,044,672
[45] Date of Patent: Sep. 3, 1991

[54] METAL-TO-METAL SEALING PIPE SWIVEL JOINT

[75] Inventors: Harold B. Skeels, Kingwood, Tex.; Christopher E. Cunningham, Edinburgh, Scotland; Edmund M. Mouret, Houston, Tex.; Donald M. Underwood, Singapore, Singapore; Michael J. Krenek, Spring, Tex.

[73] Assignee: FMC Corporation, Chicago, Ill.

[21] Appl. No.: 497,474

[22] Filed: Mar. 22, 1990

[51] Int. Cl.⁵ ............................................. F16L 17/035
[52] U.S. Cl. ........................................ 285/98; 285/184; 285/273; 285/330; 285/351; 285/917; 166/347; 166/344; 277/236
[58] Field of Search .................... 285/98, 96, 101, 105, 285/140, 139, 917, 281, 107, 109, 113, 272, 273, 274, 184, 330, 351; 166/247, 244; 277/236, 117, 190

[56] References Cited

U.S. PATENT DOCUMENTS

| | | | |
|---|---|---|---|
| 2,240,392 | 4/1941 | Dowell | 285/184 X |
| 2,501,639 | 3/1950 | Warren | 285/184 X |
| 4,178,020 | 12/1979 | Dopyera | 277/236 X |
| 4,787,655 | 11/1986 | Gross et al. | 285/273 X |
| 4,863,314 | 9/1984 | Baugh | 285/101 |

OTHER PUBLICATIONS

Brochure, Taking the Lead, FMC, Spring 1986, 8 pages.
Technical paper, OTC5316, Diverless Lay-Away Flowline Connector System, B. C. Hopkins et al, May 5–8, 1986, 10 pages.
Technical paper, OTC5885, Detail Design of a Guidlineless Subsea Satellite Completion, H. B. Skeels et al, May 1–4, 1989, 10 pages.
Technical paper, OTC5886, Field Experience and Design of the Diverless Lay-Away Flowline Subsea Tree-D. Underwood et al, May 1–4, 1989, 6 pages.

*Primary Examiner*—Dave W. Arola
*Attorney, Agent, or Firm*—W. William Ritt, Jr.; Richard B. Megley

[57] ABSTRACT

A metal-to-metal sealing pipe swivel joint especially useful with a subsea well completion system to pivotally interconnect the subsea wellhead to a lay-away flowline, the swivel joint having an annular seal element with metallic sealing surfaces and inner and outer tubular elements, also with metallic sealing surfaces, that can be moved into or withdrawn from sealing engagement with the seal element sealing surfaces.

29 Claims, 5 Drawing Sheets

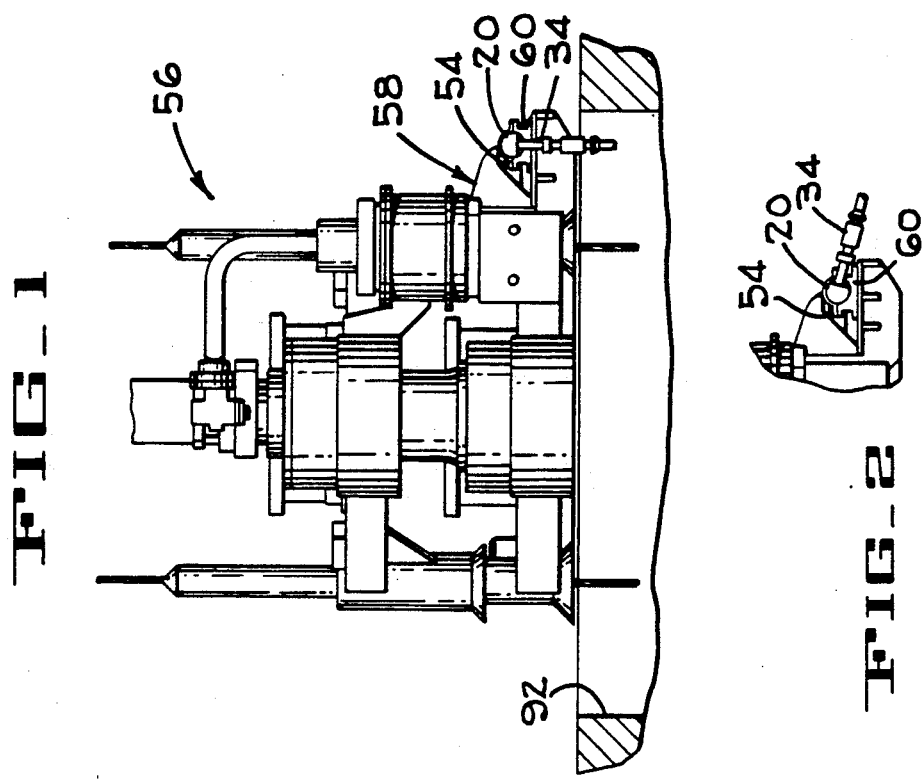
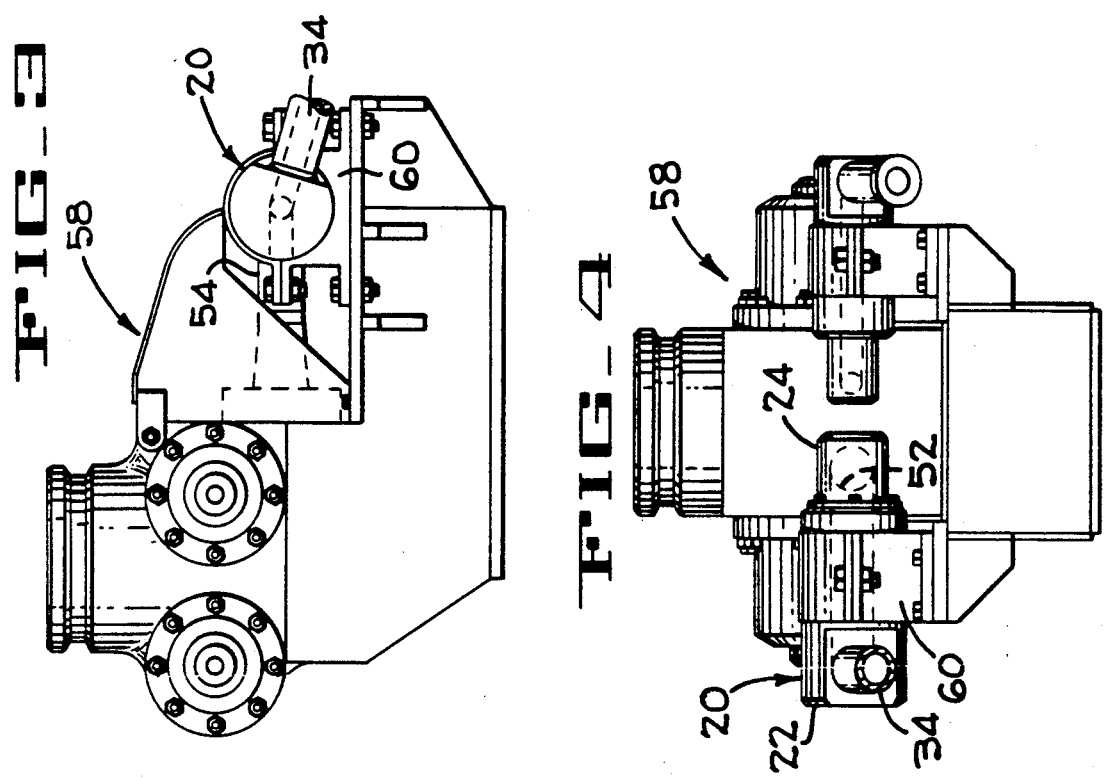

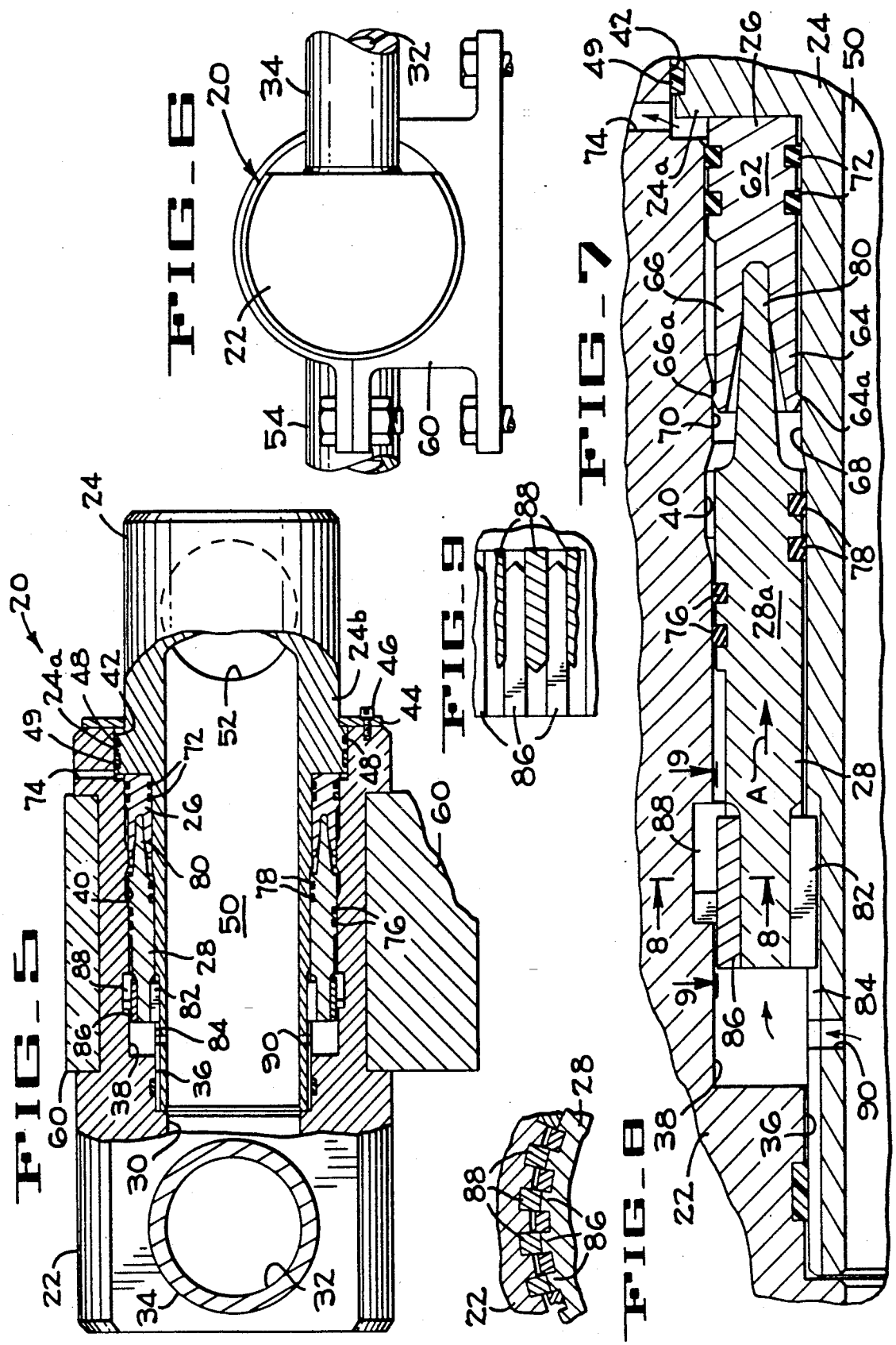

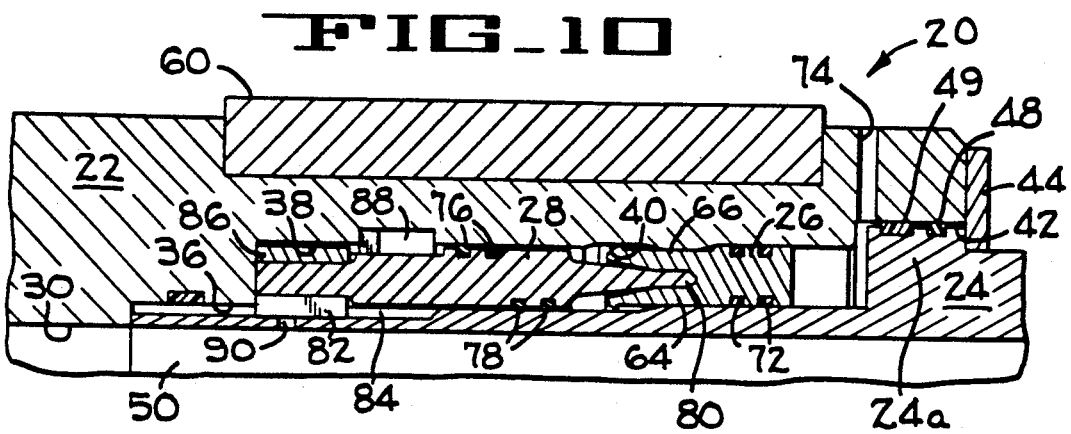
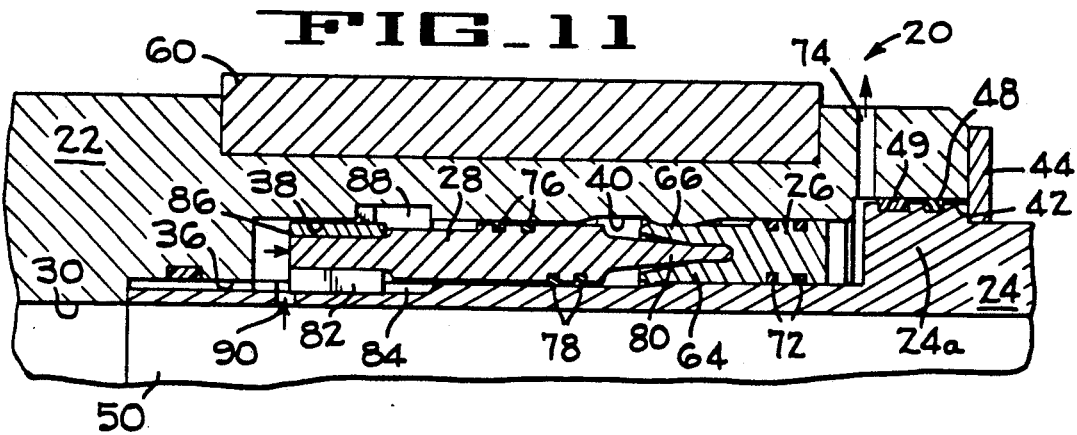
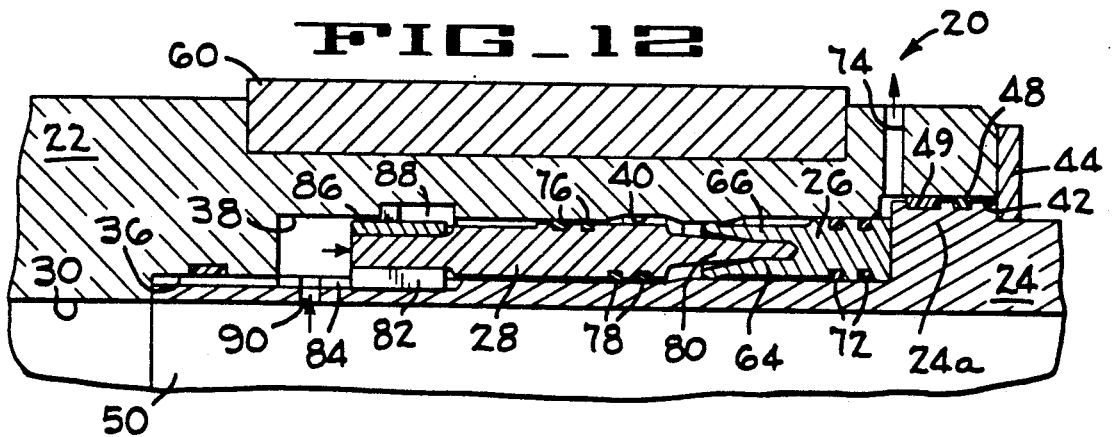
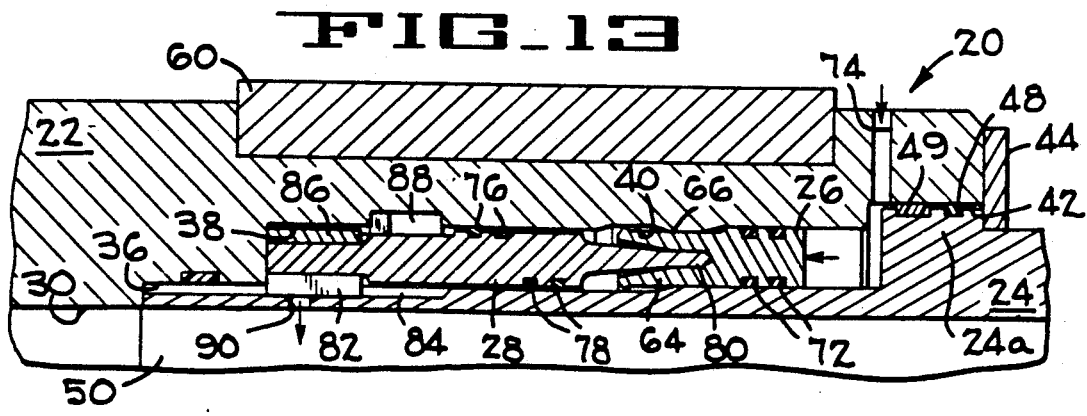

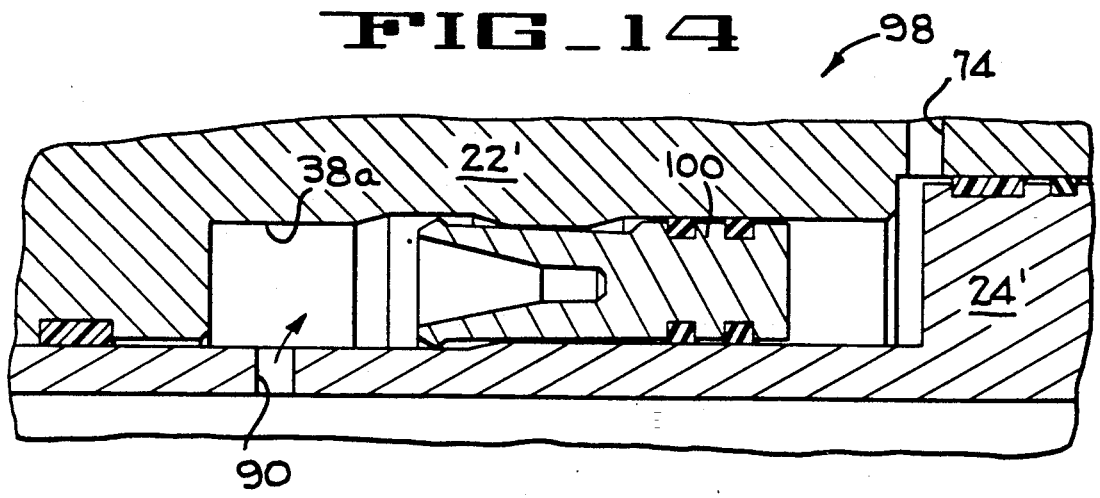
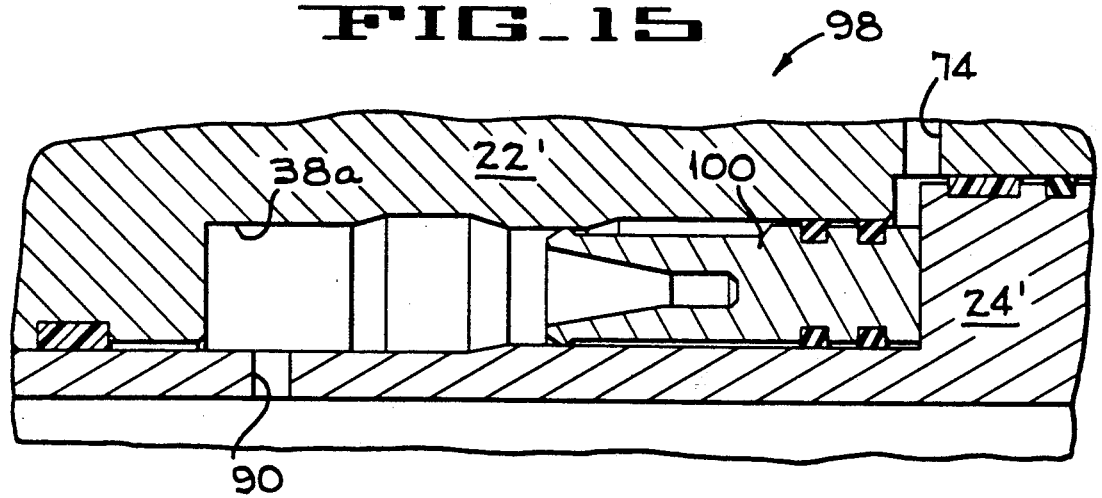

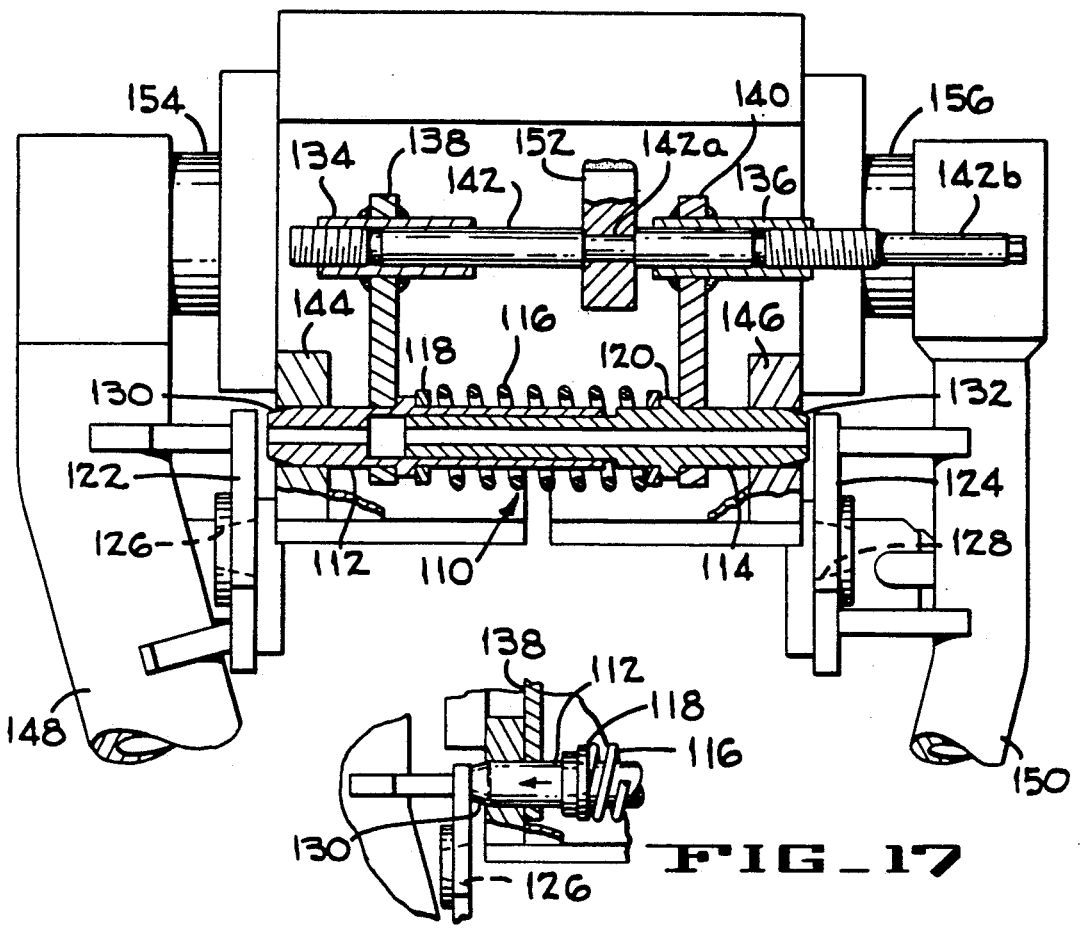
FIG_16
FIG_17
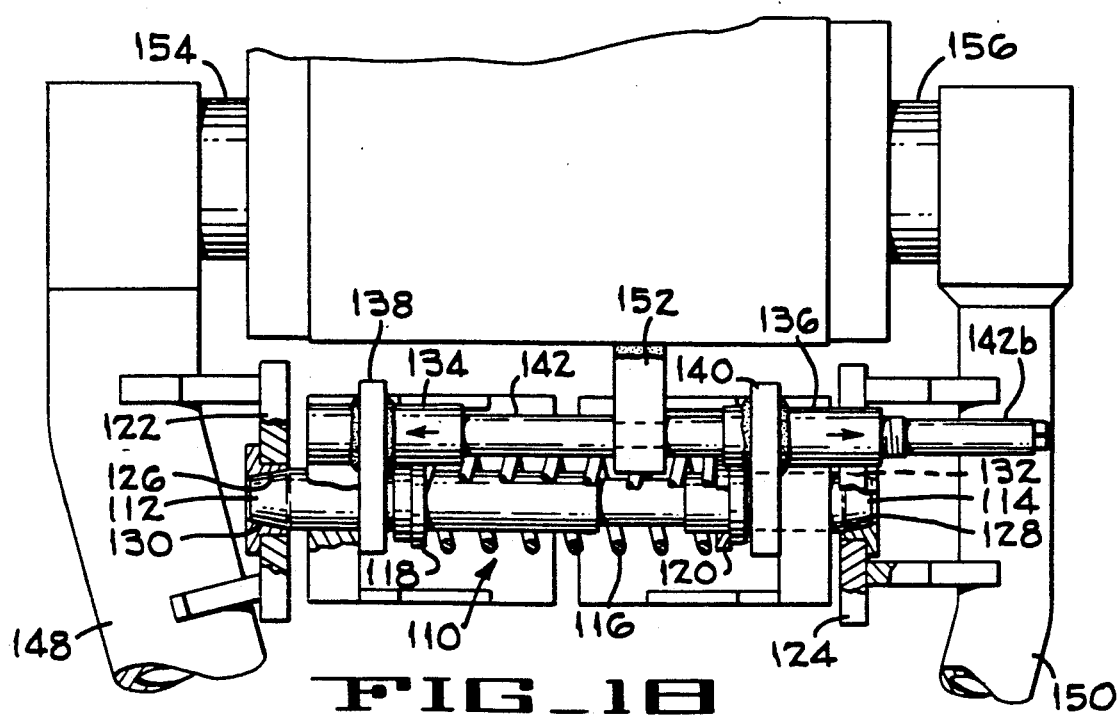
FIG_18

METAL-TO-METAL SEALING PIPE SWIVEL JOINT

BACKGROUND OF THE INVENTION

This invention relates to pipe swivel joints, and more particularly to such swivel joints that are designed to withstand large external loads such as are encountered when used in the oil and gas industry.

A major advance in the completion of offshore wells in water depths at which diver assistance is uneconomical or otherwise impractical has been the design and development of diverless lay-away flowline type subsea Christmas trees for installation on subsea wellheads. These trees utilize the flexibility of the flowline to make the flowline-to-tree connection at the surface prior to lowering the tree to the subsea wellhead, thereby eliminating the need to make that connection at a subsea location and also permitting pressure testing the connection in the drillship moonpool. Prior to the present invention the flowlines of a lay-away system were connected to the tree in a fixed manner and extended from the tree at an angle, usually about twenty degrees from the vertical, which required more space in the moonpool than was always available, especially on drillships designed for guidelineless drilling and subsea completion systems.

One proposed solution to the problem involved connecting the lay-away flowlines to the universal guidebase by swivel joints, allowing the flowlines to hang vertically in the moonpool and then seek their final angle when they and the tree are landed on the sea floor. However, in this arrangement the flowlines cannot be run with the tree, whereby the highly desireable advantage of making up the flowline-to-tree connection at the surface is not available. Furthermore, this arrangement does not include the advantage of a flowline jettison feature, and the swivel joints employed at the guide base do not have metal-to-metal seals, a feature both highly desireable and frequently required by oil and gas industry specifications where elastomer or other non-metallic seals are inadequate.

SUMMARY OF THE INVENTION

The present invention comprises a pipe swivel joint with a metallic seal system that can be energized to establish a metal-to-metal seal between the relatively rotatable inner and outer swivel joint elements, and de-energized to release the metal-to-metal seal and allow unrestricted rotation between those elements. In the below described preferred embodiment, an annular metal seal element is energized by an internal sleeve that responds to fluid pressure in the joint flow passage to move the seal element axially into a position between the relatively rotatable joint elements where inner and outer annular lips of the seal element bear against opposed annular surfaces of those joint elements in a pressure-tight interference-fit manner. In this embodiment, the metal-to-metal seal is released (de-energized) by application of external hydraulic pressure to overcome the flow passage pressure and return the seal element and sleeve to their initial positions.

A further feature of the present invention is a system for locking the relatively rotatable swivel joint elements against such rotation when the seal element is in its metal-to-metal sealing position, thereby preventing movement at the interface of the seal element and the joint elements and thus assuring that a leak will not develop in the established metal-to-metal seal. This locking system comprises a first plurality of insert keys spaced circumferentially about the outer surface of the locking sleeve, a second plurality of keys on the inner surface of the outer swivel joint element that cooperate with the first set of keys in a spline-like manner when the locking sleeve is in the advanced or seal-establishing position, and a key and slot connection between the locking sleeve and the inner swivel joint element that prevents relative rotation between the sleeve and this element at all axial positions of the sleeve.

The present invention also provides assurance that the inner and outer swivel joint elements are locked against relative rotation before the seal element moves into its functional position between the opposed sealing surfaces of those joint elements, and corresponding assurance that the seal element moves out of that functional position before the joint elements are released from their locked condition.

The swivel joint described below is ideally suited for use in situations where very high lateral loads and bending moments are experienced, such as the catenary load imposed by flowlines extending from a subsea Christmas tree while the tree is in a drillship moonpool during pressure tests. Accordingly, the invention includes a subsea tree lay-away flowline system incorporating a swivel joint with the foregoing features and, for providing additional locking support in high flowline load situations, an apparatus for releasably locking the flowlines in a desired attitude of extension from a subsea tree to which they are pivotally connected by a swivel joint of this invention.

Further features and advantages of the present invention will become apparent from the following written description and accompanying drawings.

BRIEF DESCRIPTION OF THE DRAWINGS

FIG. 1 is a side elevation of a subsea Christmas tree suspended just above a drillship moonpool and a lay-away flowline connected to the tree by a swivel joint according to the present invention and depending vertically therefrom.

FIG. 2 is a fragmentary view of the tree and flowline of FIG. 1, showing how the flowline extends laterally from the tree after the tree has been installed on its subsea wellhead.

FIG. 3 is a side elevation, on an enlarged scale, of the flowline hub, swivel joint and flowline of FIGS. 1 and 2, with the flowline shown in the FIG. 2 attitude.

FIG. 4 is a front elevation of the apparatus shown in FIG. 3, and including a second flowline connected to the hub by a second swivel joint of the present invention.

FIG. 5 is an enlarged plan view, partially broken away to a horizontal section, of a swivel joint of the present invention for interconnecting a tree and flowline as shown in FIGS. 1-4.

FIG. 6 is a side elevation of the swivel joint of FIG. 5.

FIG. 7 is an enlarged fragmentary view of the swivel joint of FIG. 5.

FIG. 8 is a fragmentary view taken along the line 8—8 of FIG. 7.

FIG. 9 is a fragmentary view taken along the line 9—9 of FIG. 7.

FIGS. 10–13 are fragmentary views, similar to FIG. 7 but on a reduced scale, showing the swivel joint seal element and locking sleeve in their various positions during metal-to-metal seal make-up and release operations.

FIG. 14 is an enlarged fragmentary view like FIG. 7, showing a modified version of the swivel joint and seal elements of the preceding Figures.

FIG. 15 is a view like FIG. 14, but showing the seal element in its functional position.

FIG. 16 is a front elevation, with some parts shown in vertical section of an apparatus for high flowline load applications to releasably lock a pair of flowlines in a desired attitude with respect to a subsea tree to which they are pivotally connected by swivel joints according to the present invention.

FIG. 17 is a fragmentary view, on a slightly reduced scale, of a portion of the apparatus of FIG. 16, showing a locking pin released for spring-biased extension into its receptacle port upon upward pivotal movement of the flowlines from their dependent running position as seen in FIG. 16.

FIG. 18 is a plan view, with some parts broken away, of the flowline locking apparatus of FIG. 16, showing the flowlines locked against pivotal movement through their swivel joints.

DESCRIPTION OF THE PREFERRED EMBODIMENT

The preferred embodiment of a pipe swivel joint according to the present invention is illustrated at 20 in FIGS. 5-13, and in FIGS. 1-4 this embodiment is shown as interconnecting a lay-away flowline to a subsea Christmas tree.

Referring first to FIGS. 5-9, the swivel joint 20 generally comprises an outer tubular element 22, an inner tubular element 24 partially extending within the element 22, an annular metallic seal element 26 between the outer and inner joint elements 22, 24, and a sleeve 28 between the outer and inner elements 22, 24, The outer element 22 has an axial bore 30 that communicates with a lateral port 32 which facilitates connecting the outer element to a pipe such as the illustrated subsea flowline 34, and the bore 30 is counterbored at 36, 38, 40 and 42 to provide annular spaces for the inner element 24, the sleeve 28, the seal element 26, and a radially enlarged portion 24a of the inner element 24, respectively. As seen in FIG. 5, a washer-like annular retainer 44 surrounds the outer portion 24b of the inner element 24 and is releasably secured to the end face of the outer element 22, such as by a plurality of circumferentially spaced cap screws 46, to retain the inner and outer elements in axial position while permitting relative rotation between them. An annular seal element 48, such as an elastomeric O-ring, functions to provide a pressure-tight dynamic seal between the inner and outer elements 24, 22, and an annular wear ring 49 of Teflon or other suitable plastic functions as a dynamic bearing between the two elements.

The inner joint element 24 has an axial bore 50 communicating with a lateral port 52, and as seen in FIG. 6 a pipe 54 extends from the port 52 to connect the joint element 24 into a fluid control system such as a subsea Christmas tree of the type illustrated at 56 in FIG. 1. In such a use, the swivel joint 20 can be firmly secured to a suitable structure, such as a flowline hub assembly 58 which is removably connectable to the tree 56, by means of a pillow block 60 (FIGS. 5 and 6) that fits around the joint's outer element 22 in a manner that facilitates rotation of that element with respect to the block.

As seen best in FIG. 7, the seal element 26 includes an annular base portion 62 from which extend axially an inner annular lip 64 and an outer annular lip 66. Each lip 64, 66 has an annular sealing surface 64a, 66a, respectively, with a radiused cross-section configuration, and in the seal's functional position (FIG. 7) these sealing surfaces 64a, 66a bear against opposed cylindrical sealing surfaces 68, 70, respectively, of the inner and outer joint elements 24, 22, respectively, in an interference manner to establish a metal-to-metal seal between the elements 24, 22. The seal element base 62 includes inner and outer pairs of annular grooves in which are annular elastomeric seals 72 that enable the seal element to be returned axially into its non-functional position (FIGS. 10 and 13), that is moved to the left from the FIG. 7 position, by hydraulic pressure inletted through a lateral port 74 in the outer element 22.

Again referring primarily to FIG. 7, the sleeve 28 includes a body portion 28a surrounding which are a pair of outer annular elastomeric seals 76, and within which are a pair of inner annular elastomeric seals 78, these seals functioning to provide a dynamic seal system between the sleeve and the joint elements 22, 24. An annular axial extension 80 of the sleeve body 28a protrudes into the annular space between the seal element lips 64, 66 to bear against the seal element base 62, so that when the sleeve 28 moves axially in the direction of the arrow A it forces the seal element 26 to move in a corresponding manner. At its other end the sleeve 28 includes a plurality of circumferentially spaced inner keys 82 that extend into axial slots 84 in the outer surface of the adjacent portion of the joint inner element 24, these keys and slots cooperating to prevent relative rotation of the sleeve 28 and element 24, but facilitate axial movement of the sleeve with respect to that element. On the outer surface of that same end of the sleeve 28 are a plurality of circumferentially spaced keys 86 that cooperate with a plurality of circumferentially spaced keys 88 on the inner surface of the joint outer element 22 in a spline-like manner to prevent relative rotation between the outer element and the sleeve when these keys 86, 88 are engaged as shown in FIG. 7-9. As seen best in FIG. 9, the forward end portion of each key 86, 88 is tapered to ease axial movement of the sleeve keys 86 into meshed engagement with the keys 88.

Accordingly, when the keys 86, 88 are engaged the outer element 22 is rotationally locked to the inner element 24 through the keys 88, 86, the sleeve 28, and the keys 82 and slots 84, whereas when the keys 86, 88 are disengaged (FIGS. 10 and 13) the outer element 22 is free to rotate with respect to the sleeve 28 and the inner element 24. The sleeve 28 thereby functions to lock the swivel joint elements when rotation therebetween is not desired, such as when the metal-to-metal seal between the elements has been established, and to release this locked status when the seal element 26 has been moved out of its functional position and freedom for such rotation is desirable.

In reference to FIGS. 10-13, movement of the seal element 26 into and out of its functional position is as follows. From a starting position where the seal element 26 and the locking sleeve 28 are in their respective locations relative to the inner and outer joint elements 24, 22 as shown in FIG. 10, the element bores 30, 50, which together comprise a flow passage for fluid to be conveyed through the joint, are subjected to fluid pressure as represented in FIG. 11. As this pressure is conducted from the flow passage through one or more ports 90 in the inner element 24 into the annular space between the inner and outer elements, the locking sleeve 28 is moved axially in the direction of the arrow B until it arrives at its final or locking position shown in FIG. 12. During this movement the seal element 26 is likewise moved axially from its FIG. 10 position into its functional metal-to-metal sealing position shown in FIG. 12. In this position the seal can be tested, as at the drillship when this swivel joint comprises the connection between a subsea tree and a flowline as depicted in FIG. 1.

When a satisfactory test is achieved, the seal element 26 is returned to its initial non-functional position shown in FIGS. 10 and 13 by venting the joint flow passage and admitting pressure through the port 74, as indicated by arrow C in FIG. 13, thereby also returning the locking sleeve 28 to its starting position and, accordingly, unlocking the joint outer element 22 for rotation about the sleeve, seal element and joint inner element 24, thereby allowing the flowline 34 to hang vertically from the subsea tree 56 to facilitate clear passage through the drillship moonpool 92. When the tree 56 has been landed and connected to its subsea wellhead, and the flowline has come to rest in its final position on the sea floor, the metal-to-metal seal can then be reestablished by repressurizing the swivel joint flow passage as above.

FIGS. 14 and 15

These figures illustrate a modified version 98 of the foregoing preferred embodiment for use where the means to lock the swivel joint outer element is exterior thereto. In this version the metallic seal element 100 is identical to the seal element 26 of the preferred embodiment, there is no locking sleeve such as 28 and no keys such as 82, 86, 88 or slots 84, and the counterbore 38a is substantially less in axial dimension than its foregoing counterpart 38. In essentially all other design respects, this version is equivalent to the swivel joint 20, and movement of the seal element 100 between its non-functional position of FIG. 14 and its functional position of FIG. 15 is achieved by fluid pressure as in the preferred embodiment, except that said pressure acts directly on the seal element 100 in moving it in either direction without aid of a locking sleeve.

FIGS. 16-18

One type of external locking apparatus that can be employed with the modified swivel joint 98 of FIGS. 14 and 15 is identified as 110 in FIGS. 16-18. The locking apparatus 110 comprises a pair of elongated lock pins 112, 114, the pin 114 telescoped into the pin 112, a helical spring 116 surrounding the telescoped pins 112, 114 and extending between radial flanges 118, 120 on the pins 112, 114, respectively, a pair of lock plates 122, 124 each with a tapered receptacle 126, 128, respectively, for receiving the tapered outer ends 130, 132 of the pins 112, 114, respectively, a pair of interiorly threaded sleeves 134, 136 to each of which is fixed a lateral strut 138, 140, respectively, and an operating shaft 142 threaded into the sleeves 134, 136.

The telescoped lock pins 112, 114 extend freely through supports 144, 146 that are mounted on a suitable portion of a structure to which pipe swivel joints are attached, such as the flowline hub assembly 58 of FIG. 3, and the plates 122, 124 are mounted in facing relationship on a pair of flowlines such as 148, 150, respectively.

The operating shaft 142 has a reduced diameter portion 142a that rotatably resides in a support strut 152 that is also mounted on the flowline hub assembly 58. The threads interconnecting the operating shaft 142 with the sleeve 134 are of opposite hand with respect to their counterparts that interconnect the shaft with the sleeve 136, so that as the shaft is rotated by, for instance, a wrench or other means temporarily engaged with a suitably configured shaft extension 142b, the sleeves will move axially toward or away from each other while the shaft is maintained in axial position by the strut 152. The helical spring 116 exerts a constant expanding bias against the pin flanges 118, 120 so that rotation of the shaft 142 to cause the aforesaid movement of the sleeves 134, 136 also results in telescopic axial movement of the pins 112, 114.

FIG. 16 illustrates the contracted position of the pins 112, 114 wherein the flowlines 148, 150 are free to pivot by means of their swivel joints 154, 156, through their full range of movement without becoming locked in any attitude by the locking apparatus 110. When it is desired to lock the flowlines and their swivel joints against pivotal movement, the operating shaft 142 is rotated to move the sleeves 134, 136 apart until the struts 138, 140 come to rest against the pin supports 144, 146, whereby the pins 112, 114 will be biased by the spring 116 into contact with their lock plates 122, 124 as illustrated in FIG. 17. As the flowlines are pivoted the lock plates are carried along until their receptacles 126, 128 come into alignment with the pins, whereupon the pins are biased further apart until their tapered ends are fully inserted into locking engagement with the receptacles as shown in FIG. 18. As will be understand, reverse rotation of the operating shaft 142 will cause withdrawal of the pins 112, 114 from their locking receptacles, freeing the flowlines for pivotal movement about their swivel joint axes.

Although the best mode contemplated for carrying out the present invention has been herein shown and described, it will be apparent that modification and variation may be made without departing from what is regarded to be the subject matter of the invention.

What is claimed is:

1. A metal-to-metal sealing pipe swivel joint comprising:
    a) an outer joint element with an inner annular metallic sealing surface;
    b) an inner tubular joint element with an outer annular metallic sealing surface, said inner element extending at least partially within said outer element;
    c) means securing together said inner and outer elements in a relatively rotatable but non-axially separable manner;
    d) an annular seal element disposed between said inner and outer joint elements, said seal element having inner and outer annular metallic sealing surfaces moveable axially between a first position wherein said seal element sealing surfaces are not in contact with said inner and outer joint elements, and a second position wherein said seal element sealing surfaces bear against said inner and outer joint element sealing surfaces to establish a metal-to-metal fluid pressure seal therebetween; and e) means to axially move said inner and outer seal element sealing surfaces between said first and second positions.

2. A pipe swivel joint according to claim 1 wherein said seal element and its sealing surfaces are moveable axially between said first and second positions in direct response to fluid pressure.

3. A pipe swivel joint according to claim 1 including a sleeve between said inner and outer tubular elements and axially adjacent said seal element, said sleeve being axially moveable to move said seal element sealing surfaces from their said first position to their said second position to establish said metal-to-metal seal.

4. A pipe swivel joint according to claim 3 wherein said sleeve is moveable in response to fluid pressure.

5. A pipe swivel joint according to claim 3 wherein said sleeve moves axially in response to axial movement of said seal element sealing surfaces from their second position to their first position.

6. A pipe swivel joint according to claim 3 including means to prevent relative rotation of said sleeve with respect to said inner joint element, and locking means to secure said sleeve and said outer joint element against relative rotation, said locking means being functional when said seal element sealing surfaces are in a metal-to-metal sealing position with said inner and outer joint elements, and non-functional when said sealing surfaces are not in contact with said inner and outer elements.

7. A pipe swivel joint according to claim 6 wherein said means to prevent relative rotation of said sleeve with respect to said inner joint element comprises at least one axial groove in an outer surface of said inner joint element, and at least one key on the inner surface of said sleeve and extending into said groove.

8. A pipe swivel joint according to claim 6 wherein said locking means comprises a plurality of inner keys spaced circumferentially on the outer surface of said sleeve, and a plurality of outer keys spaced circumferentially on the inner surface of said outer element, said inner and outer keys cooperating in a spline-like manner.

9. A pipe swivel joint according to claim 3 wherein said sleeve includes a body portion, inner and outer annular elastomeric seals between said body portion and said inner and outer joint elements, and an axial extension of the body portion that functionally resides between said seal element sealing surfaces.

10. A pipe swivel joint according to claim 1 wherein said seal element has an annular body portion, and said sealing surfaces have a radiused configuration in crosssection and reside on annular lips extending axially from said seal element body portion.

11. A pipe swivel joint according to claim 10 including inner and outer annular elastomeric seals between said seal element body portion and said inner and outer joint elements.

12. In a well completion system comprising a subsea Christmas tree and a lay-away flowline, a metal-to-metal sealing pipe swivel joint interconnecting the tree and the flowline, said swivel joint comprising:

a) an outer tubular joint element with an inner annular metallic sealing surface;

b) an inner tubular joint element with an outer annular metallic sealing surface, said inner element extending at least partially within said outer element;

c) means securing together said inner and outer elements in a relatively rotatable but non-axially separable manner;

d) an annular seal element disposed between said inner and outer joint elements, said seal element having inner and outer annular metallic sealing surfaces moveable axially between a first position wherein said seal element sealing surfaces are not in contact with said inner and outer joint elements, and a second position wherein said seal element sealing surfaces bear against said inner and outer joint element sealing surfaces to establish a metal-to-metal fluid pressure seal therebetween; and e) means to axially move said inner and outer seal element sealing surfaces between said first and second positions.

13. A well completion system according to claim 12 wherein said seal element and its sealing surfaces are moveable axially between said first and second positions in direct response to fluid pressure.

14. A well completion system according to claim 12 including a sleeve between said inner and outer tubular elements and axially adjacent said seal element, said sleeve being axially moveable to move said seal element sealing surfaces from their said first position to their said second position to establish said metal-to-metal seal.

15. A well completion system according to claim 14 wherein said sleeve is moveable in response to fluid pressure.

16. A well completion system according to claim 14 wherein said sleeve moves axially in response to axial movement of said seal element sealing surfaces from their second position to their first position.

17. A well completion system according to claim 14 including means to prevent relative rotation of said sleeve with respect to said inner joint element, and locking means to secure said sleeve and said outer joint element against relative rotation, said locking means being functional when said seal element sealing surfaces are in a metal-to-metal sealing position with said inner and outer joint elements, and non-functional when said sealing surfaces are not in contact with said inner and outer elements.

18. A well completion system according to claim 17 wherein said means to prevent relative rotation of said sleeve with respect to said inner joint element comprises at least one axial groove in an outer surface of said inner joint element, and at least one key on the inner surface of said sleeve and extending into said groove.

19. A well completion system according to claim 17 wherein said locking means comprises a plurality of inner keys spaced circumferentially on the outer surface of said sleeve, and a plurality of outer keys spaced circumferentially on the inner surface of said outer element, said inner and outer keys cooperating in a spline-like manner.

20. A well completion system according to claim 14 wherein said sleeve includes a body portion, inner and outer annular elastomeric seals between said body portion and said inner and outer joint elements, and an axial extension of the body portion that functionally resides between said seal element sealing surfaces.

21. A well completion system according to claim 12 wherein said seal element has an annular body portion, and said sealing surfaces have a radiused configuration in crosssection and reside on annular lips extending axially from said seal element body portion.

22. A well completion system according to claim 21 including inner and outer annular elastomeric seals between said seal element body portion and said inner and outer joint elements.

23. A well completion system according to claim 12 including a plurality of flowlines individually interconnected to the subsea tree by metal-to-metal sealing pipe swivel joints.

24. In a well completion system comprising a subsea Christmas tree and a pair of lay-away flowlines individually interconnected to the subsea tree by pipe swivel joints, an apparatus for releasably locking the flowlines against pivotal movement about the axes of their swivel joints, said apparatus comprising:
   a) a pair of lock pins, one pin at least partially telescoped within the other pin;
   b) means for biasing said pins axially away from each other;
   c) pin operating means for moving said pins axially towards each other;
   d) support means for said swivel joints, lock pins and pin operating means, said support means adapted for releasable connection to said Christmas tree to prevent movement of said support means relative to said tree; and
   e) receptacle means on said flowlines for receiving and holding said pins when said flowlines are in a predetermined angular attitude with respect to said Christmas tree.

25. A well completion system according to claim 24 wherein said pipe swivel joints include a metal-to-metal sealing system.

26. A well completion system according to claim 24 wherein said biasing means comprises a helical spring surrounding said telescoped pins.

27. A well completion system according to claim 24 wherein said pin operating means comprises a shaft rotatably mounted on said support means, a pair of sleeves threaded onto said shaft, one sleeve having threads of opposite hand to the other sleeve, and means interconnecting said sleeves and said pins to cause relative axial movement of said pins in response to corresponding relative axial movement of said sleeves.

28. A well completion system according to claim 27 wherein said receptacle means comprises a pair of lock plates each having at least one receptacle positioned to receive a lock pin, said plates also functioning as a stop against further axial movement of said pins away from each other in response to said biasing means until said pins and said receptacles are aligned.

29. A well completion system according to claim 24 wherein at least one of said pipe swivel joints comprises:
   a) an outer tubular joint element with an inner annular metallic sealing surface;
   b) an inner tubular joint element with an outer annular metallic sealing surface, said inner element extending at least partially within said outer element;
   c) means securing together said inner and outer elements in a relatively rotatable but non-axially separable manner; and
   d) an annular seal element disposed between said inner and outer joint elements, said seal element having inner and outer annular metallic sealing surfaces moveable axially between a first position wherein said seal element sealing surfaces are not in contact with said inner and outer joint elements, and a second position wherein said seal element sealing surfaces bear against said inner and outer joint element sealing surfaces to establish a metal-to-metal fluid pressure seal therebetween.

* * * * *